United States Patent [19]

Swoboda et al.

[11] 4,104,328

[45] Aug. 1, 1978

[54] IMPACT RESISTANT THERMOPLASTIC MOLDING COMPOSITIONS

[75] Inventors: Johann Swoboda; Rudolf Stephan, both of Ludwigshafen; Gerhard Heinz, Weisenheim, all of Fed. Rep. of Germany

[73] Assignee: BASF Aktiengesellschaft, Ludwigshafen, Fed. Rep. of Germany

[21] Appl. No.: 646,602

[22] Filed: Jan. 5, 1976

[30] Foreign Application Priority Data

Jan. 31, 1975 [DE] Fed. Rep. of Germany ....... 2503966

[51] Int. Cl.² ............................................ C08L 51/04
[52] U.S. Cl. ........................... 260/876 R; 260/29.7 E; 260/29.7 H; 260/29.7 T; 260/29.7 UP; 260/29.7 W; 260/880 R; 260/887; 260/892; 260/898; 260/901
[58] Field of Search ...... 260/33.4 R, 876 R, 29.7 UP, 260/29.7 H, 29.7 T, 29.7 W, 29.7 E

[56] References Cited

U.S. PATENT DOCUMENTS

| | | | |
|---|---|---|---|
| 3,280,219 | 10/1966 | Siebel et al. | 260/876 R |
| 3,328,377 | 6/1967 | Cooper | 260/33.4 R X |
| 3,449,471 | 6/1969 | Weitzel et al. | 260/876 R X |
| 3,880,951 | 4/1975 | Ooya et al. | 260/876 R |
| 3,886,231 | 5/1975 | Nield | 260/876 R |

FOREIGN PATENT DOCUMENTS

| | | |
|---|---|---|
| 1,238,207 | 4/1967 | Fed. Rep. of Germany. |
| 2,238,967 | 2/1974 | Fed. Rep. of Germany. |

OTHER PUBLICATIONS

Billmeyer, Textbook of Poly. Sci. (Interscience, 1962), pp. 346–347.

*Primary Examiner*—Thomas De Benedictis, Sr.
*Attorney, Agent, or Firm*—Keil, Thompson & Shurtleff

[57] ABSTRACT

Impact-resistant thermoplastic molding compositions having a hard component comprising a styrene/acrylonitrile copolymer and a soft component comprising a graft copolymer of styrene and acrylonitrile on a rubbery polymer containing butadiene. The rubbery polymer serving as base for the graft copolymer is produced by polymerization or the monomer of monomers forming said polymer in aqueous emulsion and in the presence of a small amount of an alkanol of from 1 to 4 carbon atoms. The compositions have improved color and color stability and may be processed by conventional methods to form shaped articles.

6 Claims, No Drawings

IMPACT RESISTANT THERMOPLASTIC MOLDING COMPOSITIONS

This invention relates to impact-resistant thermoplastic molding compositions, preferably ABS polymers, having improved color and color stability.

Impact-resistant thermoplastic molding compositions comprising acrylonitrile, butadiene and styrene, the so-called ABS polymers, are well known. They are generally produced by blending a hard component comprising a styrene/acrylonitrile copolymer with a soft component comprising a graft copolymer of styrene and acrylonitrile on a polybutadiene rubber.

Such blending may take place in mixing units such as extruders, kneaders or rollers, and the polymers are subjected to temperatures of 200° C or more during blending. The products are again subjected to high temperatures during subsequent processing, for example during injection molding. Such high temperatures have been found to cause varying degrees of discoloration of said ABS polymers, which may, as a result, have a yellowish to brownish color. Since the color effect of a utility article is governed by the quality of the original color, the said discoloration frequently reduces the value of the molding compositions.

German Published Application No. 2,238,967 has already proposed a method of improving the stability of ABS polymers during processing, which method consists in including small amounts of vinyl alkyl ethers having from 1 to 8 carbon atoms in the alkyl group in the form of polymerized units in the rubbery butadiene polymer serving as base for the copolymer. Similar molding compositions are disclosed by German Pat. No. 1,238,207. Although this considerably reduces the said disadvantages during processing, the use of vinyl alkyl ethers as comonomers in the production of the rubbery component is relatively expensive. Furthermore, difficulties occur during polymerization, for example increased coagulation and incomplete conversion.

It is an object of the present invention to provide impact-resistant thermoplastic molding compositions, particularly ABS polymers, which show an improved color effect and improved color stability over conventional products of this kind, and which can be produced in a simple and economical manner on an industrial scale without detriment to their other good mechanical properties.

According to the invention, this object is achieved by producing the rubbery polymer serving as base for the graft copolymer in aqueous emulsion and in the presence of a small amount of an alkanol of from 1 to 4 carbon atoms.

Thus the invention relates to thermoplastic molding compositions of
 (A) from 80 to 50% w/w, based on (A+B), of an 80:20 to 60:40 w/w copolymer of styrene and acrylonitrile and
 (B) from 20 to 50% w/w, based on (A+B), of a graft copolymer of
  1. from 20 to 50% w/w, based on (B), of an 80:20 to 60:40 w/w mixture of styrene and acrylonitrile grafted on
  2. from 80 to 50% w/w, based on (B), of a rubbery polymer containing polymerized units of
   ($\alpha$) from 10 to 100% w/w, based on the rubbery polymer (B2), of butadiene,
   ($\beta$) from 0 to 90% w/w, based on the rubbery polymer (B2), of an alkyl acrylate having from 1 to 8 carbon atoms in the alkyl and
   ($\gamma$) from 0 to 30% w/w, based on the rubbery polymer (B2), of other copolymerizable monomers, the percentages given under $\alpha$), $\beta$) and $\gamma$) totaling 100% w/w, wherein the rubbery polymer (B2) serving as base for the graft copolymer has been produced by polymerization of the monomers in aqueous emulsion and in the presence of from 0.2 to 5% w/w, based on the monomers used in the primary stage, of an alkanol of from 1 to 4 carbon atoms.

The process for manufacturing the molding compositions of the invention comprises the following stages:

The rubbery polymer (B2) serving as grafting base is first produced in the primary stage. The monomer used is preferably butadiene alone. However, butadiene/alkyl acrylate rubbers are advantageous for some applications, and it is therefore possible to use monomer mixtures containing butadiene and alkyl acrylates, which mixtures preferably contain from 30 to 70% w/w, based on the mixture, of acrylate. Butadiene/alkyl acrylate rubbers containing less than 10% by weight of butadiene and more than 90% by weight of acrylate in the form of polymerized units are generally unsatisfactory for industrial purposes. We prefer to use alkyl acrylates derived from alcohols of from 1 to 8 carbon atoms, for example ethyl acrylate, butyl acrylate and 2-ethylhexyl acrylate. If desired, up to 30% by weight, based on the total monomers, used in this primary stage, of other comonomers may be present during polymerization, examples being isoprene, styrene, acrylonitrile and their alkyl derivatives.

Polymerization of the monomers in the primary stage is carried out in aqueous emulsion in conventional manner at temperatures of from 20° to 100° C and preferably of from 50° to 80° C and advantageously at a water:monomer ratio of from 2:1 to 0.7:1. Use may be made of conventional emulsifiers such as alkali metal salts of alkyl sulfonic and alkyl aryl sulfonic acids, alkyl sulfates, fatty alcohol sulfonates, salts of higher fatty acids having from 10 to 30 carbon atoms and resin soaps. We prefer to use sodium salts of alkyl sulfonates or fatty acids of from 12 to 18 carbon atoms. It is advantageous to use the emulsifiers in amounts of from 0.1 to 5% and in particular from 1 to 2%, by weight of the monomers. Suitable polymerization initiators are conventional persulfates or redox systems, generally employed in amounts of from 0.1 to 2%, by weight of the monomers. Other polymerization auxiliaries which may be used are the conventional buffer substances for adjusting the pH to values of preferably from 6 to 10, for example sodium bicarbonate and sodium pyrophosphate, and also from 0 to 3% by weight of chain-stoppers such as mercaptans, terpinols and dimeric $\alpha$-methylstyrene.

When producing the molding compositions of the invention it is essential that the polymerization of the monomers in the primary stage be carried out in the presence of from 0.2 to 5% by weight, based on the monomers used in the primary stage, of an alkanol of from 1 to 4 carbon atoms. We prefer to use from 0.5 to 3% and in particular from 1 to 2%, by weight, of said alkanol. Examples of alkanols are methanol, ethanol and propanol. We prefer to use methanol. The alkanol may be added in a single portion to the polymerization mixture at the commencement of polymerization. Alternatively, it may be added batchwise or continuously during polymerization. No explanation has as yet been found concerning the manner in which the alkanol reacts or acts during polymerization. However, it has been found, surprisingly, that the addition of said alkanol during polymerization of the monomers in the primary stage leads to an end product showing distinctly improved color and color stability as compared with products manufactured without the use of said alkanol.

Polymerization may be stopped before conversion is complete. However, it will usually be continued until more than 90% and preferably more than 96%, by weight, of the monomers has polymerized. Such a degree of conversion is generally reached after from 4 to 20 hours. If desired, unreacted monomers, particularly butadiene, may be removed in known manner, for example by agitation under reduced pressure, entrainment with nitrogen or steam distillation.

The resulting rubbery polymer (B2) obtained in the form of a latex and serving as grafting base in the subsequent reaction, has a glass temperature below 0° C and preferably below −20° C and more preferably below −40° C. The average particle diameter of the rubber latex may vary within wide limits depending on the reaction conditions.

The rubber latex may, if desired, be agglomerated prior to the grafting reaction. This is particularly recommendable when the latex is very fine, for example has a particle diameter of less than 0.15 μ. Agglomeration of the rubber latex particles may be carried out by any conventional method, for example by refrigeration or subjection to shear forces or by the addition of electrolytes.

It has been found particularly satisfactory to effect agglomeration by the addition of an acrylate polymer dispersion as agglomeration agent, as described in German Published Application 2,427,960. Preferred acrylate polymers for this purpose are polymers of acrylates of alcohols of from 1 to 4 carbon atoms and from 0.1 to 10% by weight of monomers capable of forming water-soluble polymers, for example acrylic acid, acrylamide and N-vinylpyrrolidone. The acrylate polymer dispersion generally has a solids content of from 3 to 40% by weight and is used in amounts of from 0.2 to 20 and preferably from 1 to 5 parts by weight per 100 parts of rubber latex, based on solids. Agglomeration is carried out at a temperature of from 20° to 90° C and preferably of from 30° to 75° C. There is thus obtained, in a simple manner, a latex having a broad particle size distribution and found to be highly advantageous for achieving the desired properties of the final products.

The next stage consists in graft polymerization of styrene and acrylonitrile onto the grafting base formed by said rubbery polymer obtained in the primary stage. This is again carried out in aqueous emulsion under the usual conditions as mentioned above. Conveniently, it is carried out in the same system as the emulsion polymerization of the primary stage, further emulsifier and initiator being added if necessary. The monomers styrene and acrylonitrile to be grafted may be added in a single portion or continuously during polymerization, the proportions being selected so that from 20 to 50 parts by weight of an 80:20 to 60:40 w/w mixture of styrene and acrylonitrile are grafted to from 80 to 50 parts by weight of the rubbery polymer. Preferably, from 25 to 45 parts by weight of a 75:25 to 65:35 w/w mixture of styrene and acrylonitrile are grafted to from 75 to 55 parts by weight of the rubbery polymer.

The resulting graft copolymer (B), hereinafter also referred to as the soft component, is then blended, in a further process step, with the hard component (A) prepared separately. The hard component is formed by a styrene/acrylonitrile copolymer in which the ratio of styrene to acrylonitrile may vary from 80:20 to 60:40 by weight. The hard and soft components should be mixed in such proportions that the final product contains from 80 to 50% by weight, based on the end product, of hard component and from 20 to 50% by weight, based on the end product, of soft component.

Blending of the hard and soft components may be effected by various conventional methods. Preferably, this is effected by extrusion, kneading or roller-mixing of the two components forming separate feeds to said mixers, the soft component being fed, if desired, in only partially dehydrated form consisting of moist crumbs which are then completely dried during mixing. Alternatively, dispersions of the two components may be combined, mixing being effected by precipitating the components together, drying and melting.

During such mixing, temperatures of from about 200° to 230° C are used, the polymers being subjected to such temperatures for a period ranging up to several minutes. The molding compositions are mainly processed by injection molding. This involves subjection to temperatures of up to 280° C for short periods. It has been found that, despite these high temperatures, the molding compositions of the invention show a distinctly improved color and color stability as compared with prior art molding compositions of the same kind but prepared using a grafting base which has not been manufactured in the presence of an alkanol, the mechanical properties being at least equal to the properties of said prior art products. The molding compositions of the invention are cheaper to produce than comparable molding compositions containing polymerized units of vinyl alkyl ethers in the rubber base.

Conventional additives may be added to the molding compositions of the invention before or after blending, examples being fillers, other plastics materials, stabilizers, antistatic agents, antioxidants, plasticizers, flame-proofing agents, lubricants, dyes and pigments, preferably in a total amount of up to about 30% of the weight of the composition. The molding compositions may be processed by extrusion, vacuum molding and, in particular, injection molding to form shaped articles such as profiles, panels, tubes, housings and containers. They may also be used as agents for modifying the impact resistance of vinyl chloride polymers.

In the following Examples the parts and percentages are by weight.

EXAMPLE 1

(a) Grafting base (B2)

16 parts of butyl acrylate and 16 parts of butadiene are stirred together with 150 parts of water, 1.2 parts of the sodium salt of a paraffin sulfonic acid ($C_{12-18}$), 0.3 part of potassium persulfate, 0.3 part of sodium bicarbonate, 0.15 part of sodium pyrophosphate and 1 part of methanol in an atmosphere of nitrogen, the mixture being heated to 65° C. Following initiation of polymerization, a mixture of 44 parts of butyl acrylate and 24 parts of butadiene is added over 5 hours. On completion of this addition, the polymerization mixture is held at 65° C for a further 2 hours. There is obtained an approximately 40% aqueous polymer dispersion.

(b) Graft copolymer (B)

187.5 parts of the dispersion of the grafting base (B2) are mixed with 25 parts of a 75:25 w/w mixture of styrene and acrylonitrile and 37.5 parts of water and polymerization is effected with stirring at 70° C. The polymerization initiator used consists of 0.05 part of potassium persulfate and 0.075 part of lauroyl peroxide dissolved in the mixture of styrene and acrylonitrile. There is obtained an approximately 40% dispersion of the styrene/acrylonitrile graft copolymer (B).

(c) Polymer mixture (A+B)

250 parts of the dispersion of the graft copolymer (B) are precipitated with 400 parts of a 75:25 w/w styrene/acrylonitrile copolymer (A) dissolved in 750 parts of methanol. The resulting solid product is separated, dried and processed in a worm extruder. Injection moldings made from this material have a high impact resistance, excellent gloss and show no discoloration or yellowing.

COMPARATIVE EXAMPLE A

Example 1 was repeated except that no methanol was added during the manufacture of the grafting base (B2). The injection moldings made from the final mixture showed a distinct yellow tint.

EXAMPLE 2

(a) Grafting base (B2)

The following substances were placed in a V2A-steel vessel provided with an impeller stirrer and capable of withstanding an internal pressure of 10 atmospheres gauge:
150—parts of water
1.2—parts of the sodium salt of a paraffin sulfonic acid ($C_{12-18}$)
0.3—part of potassium persulfate
0.3—part of sodium bicarbonate
0.15— part of sodium pyrophosphate and
2—parts of methanol.

In order to remove the oxygen, the vessel was purged twice with nitrogen and the solution was then heated to 65° C in an atmosphere of nitrogen. 0.5 part of t-dodecyl mercaptan and 16.6 parts of butadiene were then added to the solution. 1 hour after the commencement of polymerization a further 83.4 parts of butadiene were fed to the solution over 5 hours. 5 hours after the completion of the butadiene addition, i.e. after a total of 11 hours, a further 0.5 part of t-dodecyl mercaptan was added. After a total reaction time of 19 hours, the conversion was 96% and the product consisted of a polybutadiene emulsion having a solids content of 39.2%, based on the emulsion. The polybutadiene latex had a glass temperature of about −80° C. The average particle size, determined by ultracentrifuging, was 0.08 μm.

(b) Graft copolymer (B)

255 parts of the above polybutadiene emulsion were diluted at 65° C with 74 parts of water. To agglomerate the latex, 30 parts of an aqueous dispersion of an ethyl acrylate copolymer were added, which copolymer contained 96% by weight of ethyl acrylate and 4% by weight of methacrylamide in the form of polymerized units. The solids content of this dispersion was 10% by weight, based on the dispersion. Following agglomeration there was obtained a polybutadiene latex having a broad particle size distribution of bimodal character, the average particle diameter being about 0.24 μ.

This polybutadiene emulsion was heated to 70° C and 0.13 part of potassium persulfate (in the form of a 3% aqueous solution), 0.02 part of t-dodecyl mercaptan and 11 parts of a mixture of styrene and acrylonitrile were added at this temperature. The ratio of styrene to acrylonitrile in said mixture was 7:3 by weight. Ten minutes after the commencement of the grafting reaction, a mixture of a further 39 parts of styrene, 17 parts of acrylonitrile and 0.1 part of t-dodecyl mercaptan was fed to the reaction mixture over 2.75 hours. The reaction temperature assumes a value of 75° C. On completion of the monomer addition, the reaction is continued for a further hour and the resulting graft copolymer is precipitated with a calcium chloride solution at 95° C and then filtered off.

(c) Polymer mixture (A+B)

Moist crumbs of the grafted polybutadiene (B) were worked into a molten styrene/acrylonitrile copolymer (A) by means of an extruder, said copolymer (A) containing 65% by weight of polymerized units of styrene and 35% by weight of polymerized units of acrylonitrile. The grafted polybutadiene was mixed with the styrene/acrylonitrile copolymer in a ratio of 3:7 by weight. The molding composition showed good mechanical properties and no discoloration or yellowing could be observed before or after processing by injection molding.

COMPARATIVE EXAMPLE B

Example 2 was repeated except that no methanol was added during the manufacture of the grafting base (B2). Injection moldings made from the final mixture showed a strong yellow tint.

EXAMPLE 3

(a) Grafting base (B2)

The following substances were placed in a V2A-steel vessel equipped with an impeller stirrer and capable of withstanding an internal pressure of 10 atmospheres gauge:
150—parts of water
1.2—parts of the sodium salt of a paraffin sulfonic acid ($C_{12-18}$)
0.3—part of potassium persulfate
0.3—part of sodium bicarbonate
0.15—part of sodium pyrophosphate and
2—parts of isopropanol.

To remove the oxygen, the vessel was purged twice with nitrogen and the solution was then heated to 65° C in an atmosphere of nitrogen. 0.5 part of t-dodecyl mercaptan, 10 parts of styrene and 6.6 parts of butadiene were then added to the solution. One hour after commencement of polymerization a further 73.4 parts of butadiene and 10 parts of styrene were fed to the reaction mixture over 5 hours. Five hours after completion of said monomer addition, i.e. after a total of 11 hours, a further 0.5 part of t-dodecyl mercaptan was added. After a total reaction time of 16 hours the conversion is 96% and the product is an emulsion having a solids content of 39.2%, based on the emulsion. The average particle size, measured by ultracentrifuging, was 0.075 μm.

(b) Graft copolymer (B)

255 parts of the butadiene polymer emulsion were diluted with 74 parts of water at 65° C. The latex was agglomerated by the addition of 30 parts of an aqueous dispersion of an ethyl acrylate copolymer containing 96% by weight of ethyl acrylate and 4% by weight of methacrylamide in the form of polymerized units. The solids content of this dispersion was 10% by weight, based on the dispersion. After agglomeration, a butadiene polymer latex was obtained which showed a broad particle size distribution of bimodal character, the average particle diameter being about 0.21 μ.

The resulting butadiene polymer emulsion was heated to 70° C and 0.13 part of potassium persulfate (in the form of a 3% aqueous solution), 0.02 part of t-dodecyl mercaptan and 11 parts of a 7:3 w/w mixture of styrene and acrylonitrile were added at this temperature. Ten minutes after the commencement of the grafting reaction there was added, over 2.75 hours, a mixture of a further 39 parts of styrene, 17 parts of acrylonitrile and 0.1 part of t-dodecyl mercaptan. The reaction temperature assumed a value of 75° C. On completion of the said monomer addition, the reaction was continued for a further hour and the resulting graft copolymer was precipitated with a calcium chloride solution at 95° C and filtered off.

(c) Polymer mixture (A+B)

The moist crumbs of the grafted butadiene polymer were worked into a molten styrene/acrylonitrile copolymer by means of an extruder, said copolymer containing 65% by weight of styrene and 35% by weight of acrylonitrile in the form of polymerized units. The grafted butadiene polymer was mixed with said styrene/acrylonitrile copolymer in a ratio of 3:7 by weight. Injection moldings made from this material show a high level of properties and no discoloration or yellowing.

We claim:

1. A thermoplastic molding composition consisting essentially of:
  (A) from 80 to 50% w/w, based on (A+B), of an 80:20 to 60:40 w/w copolymer of styrene and acrylonitrile; and
  (B) from 20 to 50% w/w, based on (A+B), of a graft copolymer of
    (1) from 20 to 50% w/w, based on (B), of an 80:20 to 60:40 w/w mixture of styrene and acrylonitrile grafted on
    (2) from 80 to 50% w/w, based on (B), of a rubbery polymer containing polymerized units of
      (α) from 10 to 100% w/w, based on the rubbery polymer (B2), of butadiene,
      (β) from 0 to 90% w/w, based on the rubbery polymer (B2), of an alkyl acrylate having from 1 to 8 carbon atoms in the alkyl, and
      (γ) from 0 to 30% w/w, based on the rubbery polymer (B2), of another monomer selected from the group consisting of isoprene, styrene, acrylonitrile and their alkyl derivatives, the percentages given under (α), (β) and (γ) totaling 100% w/w, with the proviso that the rubbery polymer (B2) serving as base for the graft copolymer has been prepared in a primary stage by polymerization of the monomers (α), (β) and (γ) in the proportions recited under (B2), said polymerization being carried out in an aqueous emulsion and in the presence of from 0.2 to 5% w/w, based on said monomers used in the primary stage, of an alkanol of from 1 to 4 carbon atoms.

2. Thermoplastic molding composition as claimed in claim 1, wherein the rubbery polymer (B2) is polybutadiene.

3. Thermoplastic molding composition as claimed in claim 1, wherein the rubbery polymer (B2) is a butadiene/alkyl acrylate copolymer containing from 30 to 70% by weight of polymerized units of alkyl acrylate.

4. Thermoplastic molding composition as claimed in claim 1, wherein the rubbery polymer (B2) has been prepared in the presence of from 0.5 to 3% by weight of said alkanol.

5. Thermoplastic molding composition as claimed in claim 1, wherein the rubbery polymer (B2) has been prepared in the presence of methanol.

6. Thermoplastic molding composition as claimed in claim 1, wherein the rubbery polymer (B2) has been prepared in the presence of isopropanol.

* * * * *